July 22, 1941. J. A. WEIMER 2,250,073
CORN PLANTER
Filed July 11, 1940 3 Sheets-Sheet 2

Inventor
John A. Weimer
By Clarence A. O'Brien
Attorney

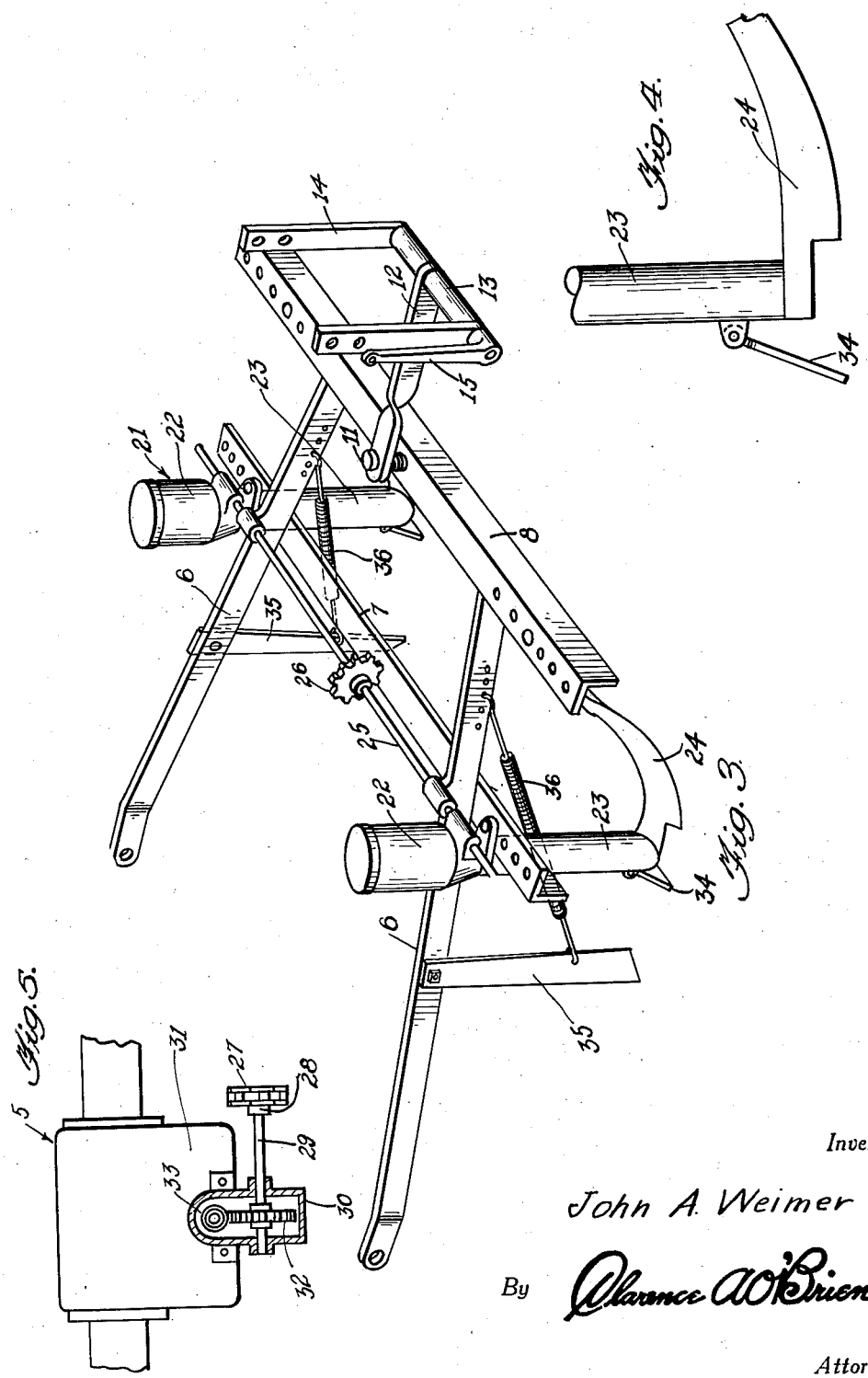

Patented July 22, 1941

2,250,073

UNITED STATES PATENT OFFICE 2,250,073

CORN PLANTER

John A. Weimer, Salisbury, Pa., assignor of one-half to Lawrence O. Weimer, Salisbury, Pa.

Application July 11, 1940, Serial No. 344,963

1 Claim. (Cl. 111—59)

This invention relates to a corn planter, and has for the primary object the provision of a device of this character which may be easily attached and detached from a tractor and when connected therewith will have the dropping or planting mechanism thereof driven by power received from the tractor and will be carried entirely by the latter with the planting operation carried out directly in front and in clear view of the operator of the tractor, the device including means for regulating the planting depth of the grain and also permitting the device to be positioned entirely clear of the ground and obstructions that may be thereon, whereby the tractor may be driven from one place to another without interference from the device.

With these and other objects in view as will become more apparent as the description proceeds, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a tractor equipped with a corn planter constructed in accordance with my invention.

Figure 3 is a perspective view illustrating the planter removed from the tractor.

Figure 4 is a fragmentary side elevation showing one of the planter shoes and discharge tube connected therewith.

Figure 5 is a fragmentary side elevation, partly in section, illustrating the means of delivering power from the tractor to the planter.

Figure 1:
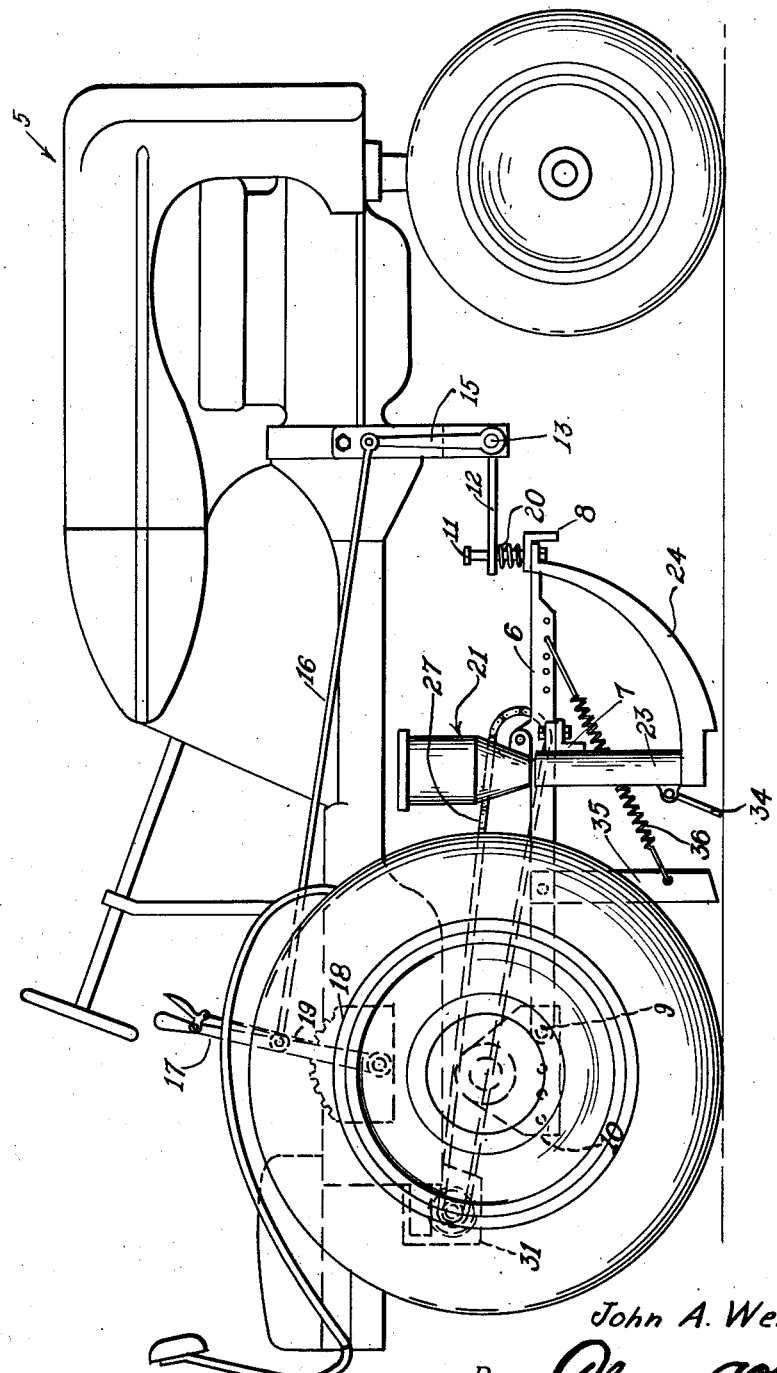
Figure 2:
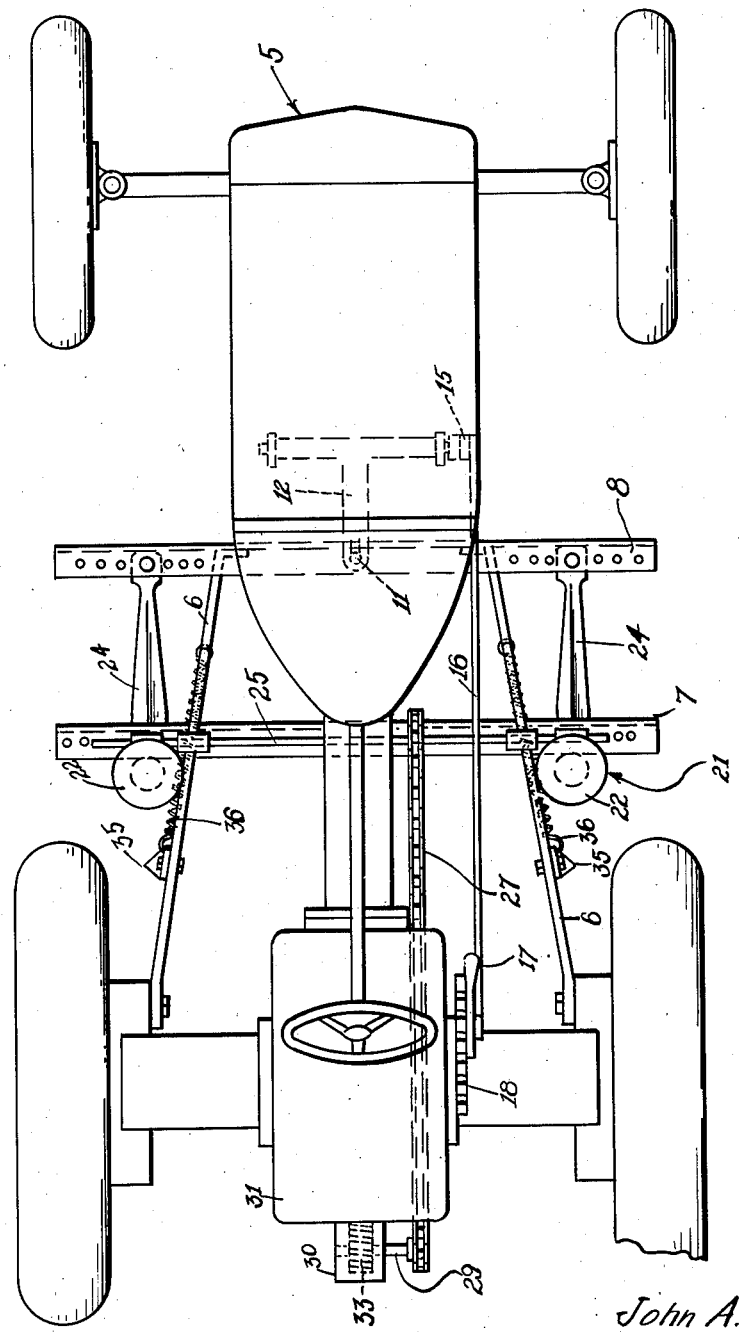
Figure 2 is a top plan view illustrating the same.

Referring in detail to the drawings, the numeral 5 indicates a conventional type of tractor used extensively in farm work and to which the present invention is easily adaptable. Of course, it is to be understood that the invention can be adapted to tractors of other types with minor alterations without departing from the spirit and scope of the present invention.

The planter is in the form of an attachment which may be readily attached and detached from the tractor when desired. The planter is clearly shown in Figure 3 in the form of an attachment and consists of a pair of side bars 6 connected together adjacent the forward ends thereof by transversely arranged bars 7 and 8 each of angle iron construction. The rear ends of the side bars 6 are equipped with openings to receive fasteners 9 for detachably connecting the side bars onto draft plates 10 secured on the rear axle housing of the tractor and which forms a part of the conventional construction of the tractor. The plates 10 have a series of openings any one of which may receive the fasteners 9 for adjusting the side bars forwardly and rearwardly with respect to the tractor. It is further to be understood that the fasteners 9 pivotally connect the side bars on the tractor for upward and downward movements.

The transverse bar 8 is equipped with a king pin 11 intermediate its ends and which connects thereto an arm 12 secured on a shaft 13 journaled in spaced brackets 14 mounted on the forward portion of the tractor. The shaft 13 also has secured thereto an arm or lever 15 to which is pivoted a connecting link 16. The link 16 is connected to a control lever 17 pivotally mounted on a quadrant 18 mounted on the tractor in convenient reach of the driver of the tractor. The control lever 17 is equipped with a conventional detent 19 to coact with the quadrant 18 in securing the control lever in various adjusted positions.

A coil spring 20 is mounted on the king pin between the arm 12 and the cross bar 8 which will permit a limited upward and downward movement of the side bars should the planting mechanism carried thereon engage with obstructions.

The planting mechanism is indicated in its entirety by the character 21 and consists primarily of a pair of seed hoppers 22 to which are connected downwardly extending tubes 23 terminating in close proximity to the ground and have connected to their lower ends planter shoes 24 adapted to act on the soil for the purpose of forming therein furrows to receive the seeds from the hoppers.

The hoppers further include the usual dropping mechanism of which a shaft 25 forms a part and through the rotation of the shaft the dropping mechanism is operated. The shaft 25 has secured thereto a sprocket gear 26 over which is trained a sprocket chain 27 and the latter is also trained over a sprocket gear 28 secured on a shaft 29. The shaft 29 is journaled in bearings carried by a housing 30 mounted on the differential housing 31 of the tractor. A worm gear 32 operates in the housing 30 and is secured on the shaft 29 and meshes with a worm 33 secured to a power takeoff shaft extending outwardly from the differential housing 31 and which is a conventional part of the tractor.

Hinged to the tubes 23 adjacent their lower ends are covering plates 34 which trail the planter shoes 24 and act to lightly cover the seeds deposited in the furrows with soil.

Covering blades 35 are secured to the side bars 6 rearwardly of the tubes 23 to dig into the soil and direct the soil displaced thereby onto the planted seeds. The blades have a slight twist thereto so that the lower portions thereof which act on the soil will displace the soil toward and onto the planted seeds. Yieldable braces 36 connect the elements 35 to the forward portions of the side bars 6. The braces include in their construction coil springs and also may be adjusted along the side bars, if desired, openings being provided in the side bars to permit the adjustment to be carried out.

Also the cross bars 7 and 8 are provided with a series of openings, the purpose of which is to permit the planter mechanism to be adjusted transversely as well as the side bars.

A planter in the form of an attachment as described and shown in the drawings can be easily installed upon a tractor and when in operation will be under direct control and under the observation of the driver of the tractor. Further, it will be seen that the entire attachment is supported by the tractor and that it can be easily raised and lowered through the operation of the control lever 17 for regulating the depth of planting of the seeds and further will permit elevation of the attachment to such an extent that it will clear the ground as well as ordinary obstructions thereon so that the tractor can be driven from one place to another with the planter attachment connected thereto without danger of catching into ruts, large stones and similar obstructions.

While I have shown and described the preferred embodiment of my invention, it will be understood that minor changes in construction, combination and arrangement of parts may be made without departing from the spirit and scope of the invention as claimed.

Having thus described the invention, what I claim is:

In a corn planter for a tractor, a pair of side bars pivotally and adjustably mounted on a rear portion of a tractor and extending forwardly under the latter, spaced cross members connecting said bars with one of said members located at the forward ends of the bars and the other member located on the bars a limited distance rearwardly of the forward ends of said bars, planting mechanisms detachably and adjustably secured on said members and adjustable transversely of the tractor and toward and from each other, an arm yieldably connected to the forward cross member, a hanger secured to the tractor and including a rotatably supported shaft having said arm secured thereto and a lever secured to said shaft, and an operating means for releasably securing said shaft and for the rotation of the shaft in opposite directions to increase and decrease the depth of action of the planting mechanisms in the soil.

JOHN A. WEIMER.